J. MAGEE.
SINK-TRAP.
No. 192,078. Patented June 19, 1877.
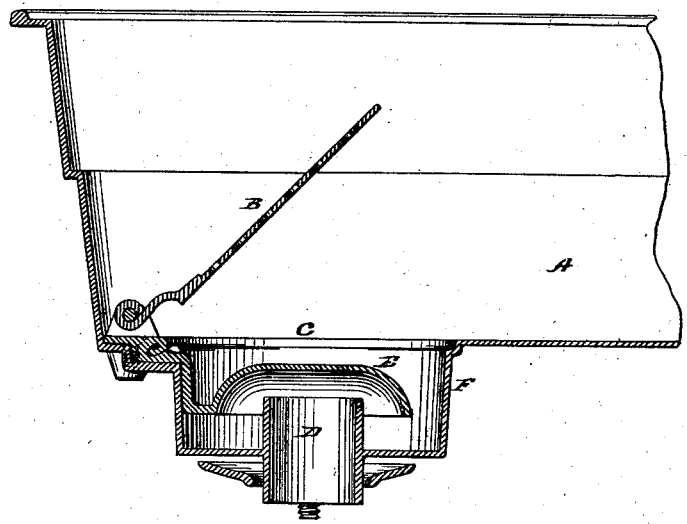
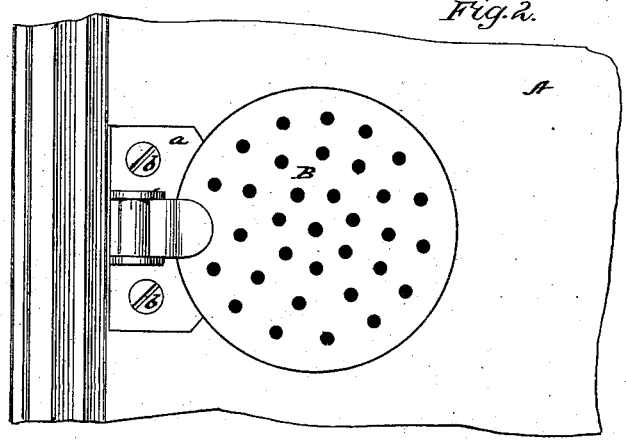

UNITED STATES PATENT OFFICE.

JOHN MAGEE, OF CHELSEA, MASSACHUSETTS.

IMPROVEMENT IN SINK-TRAPS.

Specification forming part of Letters Patent No. 192,078, dated June 19, 1877; application filed May 24, 1877.

*To all whom it may concern:*

Be it known that I, JOHN MAGEE, of Chelsea, State of Massachusetts, have invented certain new and useful Improvements in Sink-Traps, of which the following is a clear, full, and exact description, reference being had to the accompanying drawings, forming a part of this specification, in which—

Figure 1 is a longitudinal vertical section. Fig. 2 is a top or plan view.

My invention relates to improvements in traps for kitchen-sinks, and has for its object to furnish a trap which cannot be readily removed, thereby preventing the obnoxious gases escaping into the room, as is often the case in the class of removable traps, when servants are in a hurry to empty the sink of its contents by removing the trap from the sink; and my invention consists in the combination with a sink of a removable or hinged strainer and a stationary trap, as will be hereinafter fully described.

In the drawing, A represents a sink with my improvements attached thereto. B represents a strainer-plate hinged or otherwise removably secured to the bottom of the sink, so as to cover the hole C in the bottom thereof. The trap consists of the pipe D, convex cap E, and dish F. The pipe D extends up into and above the bottom of the dish. and is permanently secured thereto by soldering, or in any other equivalent manner. The dish is also secured in a like manner to the under side of the sink. The convex cap E is secured by the arm $c$ to the bottom of the sink, or, if desired, can be secured to the plate $a$, which is secured upon the bottom of the sink by screws $b$ $b$, so that said cap can be removed when it is desired to clean the trap.

From the above-described construction it will be observed that the cap cannot be readily removed for the purpose of more quickly emptying the sink of its contents, as above referred to, but only removable when it is desired to clean the trap.

What I claim as new, and desire to secure by Letters Patent, is—

The combination with a sink of the hinged or removable strainer plate B, stationary convex cap E, provided with arm $c$, dish F and pipe D, the several parts constructed and relatively secured together and to the sink, substantially as herein shown and described.

JOHN MAGEE.

Witnesses:
 ALBT. N. TARLIN,
 F. O. ROBINSON.